(12) United States Patent
Minoda et al.

(10) Patent No.: US 8,804,803 B2
(45) Date of Patent: Aug. 12, 2014

(54) TRANSMITTING DEVICE, TRANSMITTING METHOD, INTEGRATED CIRCUIT, AND PROGRAM

(75) Inventors: Yuki Minoda, Osaka (JP); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/816,770

(22) PCT Filed: Jun. 13, 2012

(86) PCT No.: PCT/JP2012/003861
§ 371 (c)(1),
(2), (4) Date: Feb. 13, 2013

(87) PCT Pub. No.: WO2012/172795
PCT Pub. Date: Dec. 20, 2012

(65) Prior Publication Data
US 2013/0142243 A1    Jun. 6, 2013

(30) Foreign Application Priority Data

Jun. 16, 2011 (JP) ................................. 2011-134615

(51) Int. Cl.
| | |
|---|---|
| *H04B 17/00* | (2006.01) |
| *H04L 12/56* | (2006.01) |
| *H04L 7/00* | (2006.01) |
| *H04N 21/6373* | (2011.01) |
| *H04N 21/262* | (2011.01) |
| *H04N 21/24* | (2011.01) |

(52) U.S. Cl.
CPC ............ *H04L 7/0041* (2013.01); *H04L 47/283* (2013.01); *H04L 47/25* (2013.01); *H04N 21/6373* (2013.01); *H04N 21/26216* (2013.01); *H04N 21/2402* (2013.01)

USPC ........................................................ 375/226

(58) Field of Classification Search
USPC ......... 375/224–225, 227, 285, 295, 316, 340, 375/358, 371; 455/68–69, 115.1, 115.2, 455/115.3
See application file for complete search history.

(56) References Cited

U.S. PATENT DOCUMENTS

| | | | |
|---|---|---|---|
| 7,480,341 B2 * | 1/2009 | Jeong et al. ................... | 375/267 |
| 7,583,981 B2 * | 9/2009 | Suzuki ....................... | 455/562.1 |

(Continued)

FOREIGN PATENT DOCUMENTS

| | | |
|---|---|---|
| JP | 2004-215199 | 7/2004 |
| JP | 2004-254025 | 9/2004 |

OTHER PUBLICATIONS

International Search Report issued Jul. 24, 2012 in corresponding International Application No. PCT/JP2012/003861.

(Continued)

*Primary Examiner* — Khanh C Tran
(74) *Attorney, Agent, or Firm* — Wenderoth, Lind & Ponack, L.L.P.

(57) ABSTRACT

A transmitting device can suppress degradation of the video quality and determine a proper transmission rate, and include a transmitting unit that transmits a communication packet to a receiving device, a receiving unit that receives a feedback packet, which is a response signal corresponding to the communication packet, from the receiving device, a detecting unit that detects a change of a reception interval of the feedback packet, and a transmission rate determining unit that decreases a transmission rate at which the transmitting unit transmits the communication packet in the case where the change of the reception interval is detected, and increases the transmission rate on the basis of an amount of change of a travelling speed of at least either the transmitting device or the receiving device before and after the decrease in the transmission rate.

18 Claims, 12 Drawing Sheets

(56) References Cited

U.S. PATENT DOCUMENTS

2009/0022063 A1* 1/2009 Ju et al. .................. 370/252
2013/0028088 A1* 1/2013 Do et al. .................. 370/235

OTHER PUBLICATIONS

Takehiro Hoshikawa et al., "Measurement of Relationship between Frame Arrival Rate and Sending Rate of DCCP CCID3 Flows in WLANs", The Institute of Electronics, Information and Communication Engineers, IEICE Technical Report, vol. 109, No. 380, MoMuC2009-52, Jan. 14, 2010, pp. 7-12 (with English Abstract).

S. Floyd et al., "RFC 5348 TCP Friendly Rate Control (TFRC): Protocol Specification", Sep. 2008.

* cited by examiner

TRANSMITTING DEVICE, TRANSMITTING METHOD, INTEGRATED CIRCUIT, AND PROGRAM

TECHNICAL FIELD

The present invention relates to a transmitting device that transmits a communication packet.

BACKGROUND ART

A conventional transmitting device that transmits a communication packet to a receiving device via a communication channel includes a transmitting unit that transmits the communication packet to the receiving device, a receiving unit that receives a feedback packet, which is a response signal corresponding to the communication packet, from the receiving device, and a detecting unit that detects a change of a reception interval of the feedback packet, and in the case where the change of the reception interval is detected, decreases the transmission rate at the transmitting unit transmits the communication packet, and after the decrease in the transmission rate, increases the transmission rate (Refer to PTL 1 and Non-PTL 1).

CITATION LIST

Patent Literature

[PTL 1] Japanese Unexamined Patent Application Publication No. 2004-215199

Non Patent Literature

[Non-PTL 1] S. Floyd, M. Handley, J. Padhye and J. Widmer "RFC 5348 TCP Friendly Rate Control (TFRC): Protocol Specification"

SUMMARY OF INVENTION

Technical Problem

However, in such conventional receiving device, when a transmission rate is increased, the increase amount may be improper.

The present invention is conceived in consideration of this problem, and its object is to provide a transmitting device, a transmitting method, a program, a recording medium, and an integrated circuit that can properly increase the transmission rate.

Solution to Problem

A transmitting device according to an aspect of the present invention is a transmitting device that transmits a communication packet to a receiving device via a communication channel, the transmitting device including: a transmitting unit configured to transmit the communication packet to the receiving device; a receiving unit configured to receive, from the receiving device, a feedback packet that is a response signal corresponding to the communication packet; a detecting unit configured to detect a change of a reception interval of the feedback packet; and a transmission rate determining unit configured to decrease a transmission rate at which the transmitting unit transmits the communication packet in the case where the change of the reception interval is detected, and to increase the transmission rate on the basis of an amount of change of a packet loss rate representing a loss rate of the communication packet and a jitter that is an amount of change of a transmission time of the communication packet, before and after the decrease in the transmission rate.

These general or specific modes may be implemented by a system, a method, an integrated circuit, a computer program, or a recording medium, or may be implemented by any combination of the system, the method, the integrated circuit, the computer program, and the recording medium.

Advantageous Effects of Invention

The transmitting device according to the present invention can determine the increase amount of the transmission rate more properly.

Figure 1:
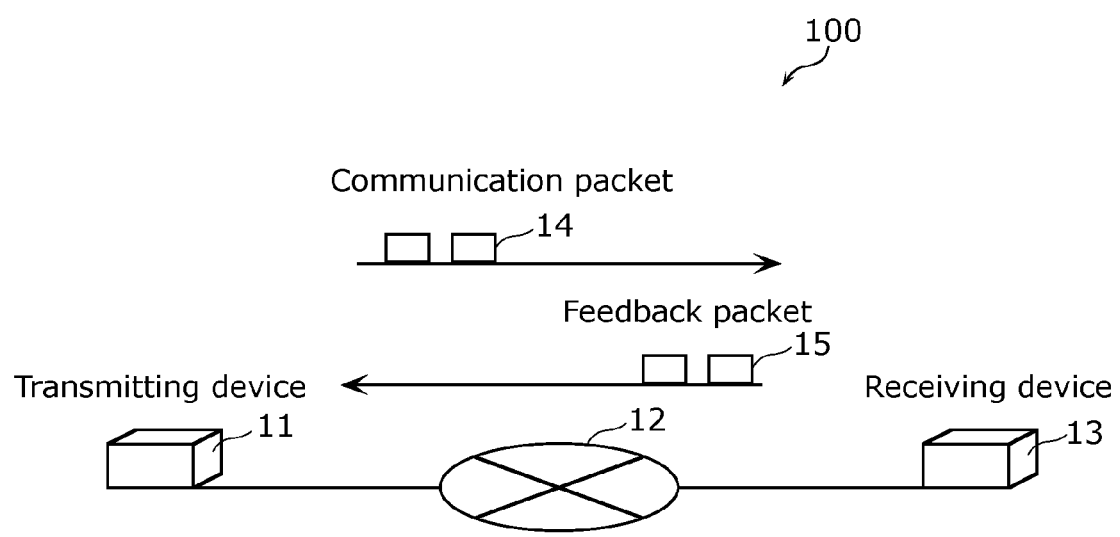
FIG. 1 is a view showing a configuration of a network in accordance with Embodiments 1 and 2 according to the present invention.

DESCRIPTION OF EMBODIMENTS (Findings as the Basis for the Present Invention)

This technique relates to a transmitting device, and in particular, to a transmitting device that transmits a communication packet to a receiving device via a communication channel.

One of techniques of achieving high-quality video and audio transmission (hereinafter referred to as AV transmission) in a network is a band estimation technique (TFRC: TCP-Friendly Rate Control) of estimating available communication bandwidth (free bandwidth) (Non-PTL 1). According to the TFRC, the transmitting device receives a feedback packet responding to the communication packet transmitted from the transmitting device to the receiving device. The transmitting device calculates a packet loss rate and a delay from the received feedback packet. Based on information including the packet loss rate, the transmitting device estimates the free bandwidth in the network.

According to the TFRC, in the case where the transmitting device does not receive the feedback packet for a certain time, reduction processing of decreasing a value of the transmission rate by half is executed. After that, the transmitting device executes recovery processing of gradually increasing the transmission rate according to a predetermined procedure. Thus, in the event of network congestion, the transmitting device can temporarily decrease the transmission rate, thereby reducing packet losses due to the congestion (Non-PTL 1).

However, when the transmission rate is rapidly decreased beyond necessity in the AV transmission, the video quality degrades, which is undesirable.

Thus, for example, PTL 1 discloses a method of switching the transmission rate according to change of the network congestion state.

However, according to the above-mentioned technique of decreasing the transmission rate and then, gradually recovering the transmission rate, when the decreased transmission rate is recovered, a proper transmission rate cannot be determined. This presents a problem especially in the case where the feedback packet does not arrive due to any factor other than the network congestion.

Other than the network congestion, there are some factors that contribute to non-arrival of the feedback packet. For example, in a wireless communication environment, non-arrival of the feedback packet often is often caused by retransmission in an MAC layer in a wireless section. In this case, when the processing of decreasing the transmission rate once and then, gradually increasing the transmission rate is executed in response to non-arrival of the feedback packet, a following problem occurs. That is, the above-mentioned processing has no effect on non-arrival of the feedback packet and moreover, takes a long time for the recovery of the video quality since the transmission rate is decreased.

The present invention provides a transmitting device capable of solving the problem, suppressing the degradation of the video quality, and determining the proper transmission rate.

A transmitting device from an aspect of the present invention is a transmitting device that transmits a communication packet to a receiving device via a communication channel, the transmitting device including: a transmitting unit configured to transmit the communication packet to the receiving device; a receiving unit configured to receive, from the receiving device, a feedback packet that is a response signal corresponding to the communication packet; a detecting unit configured to detect a change of a reception interval of the feedback packet; and a transmission rate determining unit configured to decrease a transmission rate at which the transmitting unit transmits the communication packet in the case where the change of the reception interval is detected, and to increase the transmission rate on the basis of an amount of change of a packet loss rate representing a loss rate of the communication packet and a jitter that is an amount of change of a transmission time of the communication packet, before and after the time when the transmission rate is decreased.

With this configuration, when the packet loss rate increases, the transmitting device decreases the transmission rate once. After the transmission rate is decreased, the dimension of the effect of the decrease in the transmission rate on the packet loss rate and the jitter can be judged. Thus, based on the dimension of the effect, the transmitting device can properly recover the transmission rate. Therefore, the transmitting device can suppress the degradation of the video quality and properly determine the transmission rate.

That is, with this configuration, in the case where the decrease in the transmission rate improves the packet loss rate or the jitter, it is judged that the decrease in the transmission rate is meaningful and therefore, the transmission rate is gradually increased. On the contrary, in the case where the decrease in the transmission rate does not improve the packet loss rate or the jitter so much, high priority can be placed on the image quality by rapidly recovering the transmission rate of the packet. Accordingly, it can be prevented that the transmission rate is not recovered after the decrease in the transmission rate while keeping excessively low. As a result, the transmitting device can suppress the degradation of the video quality and properly determine the transmission rate.

For example, when it is determined that the above-mentioned reception interval ($T_L$ in S41 in FIG. 5) is longer than a threshold (threshold $T_{RTCP}$) (YES in S41), next second transmission (S53 in FIG. 6 and FIG. 11) may be performed. The second transmission is performed at a second transmission rate that is lower than a first transmission rate in first transmission before the detection. When it is judged that the decrease in the transmission rate is meaningful as described above on the basis of an amount of change (a jitter W in FIG. 7, a difference Ve–Vs of the travelling speed in FIG. 12) between a value such as the above-mentioned transmission time or a below-mentioned travelling speed in the first transmission (Refer to S52 and S82) and a value in the second transmission (S61 in FIG. 7, S91 in FIG. 12) (YES in S64, NO in S92), a lower transmission rate (Refer to a small increased width U/2 in S66 and S93) may be designated as a third transmission rate in third transmission after the second transmission. When it is judged that the decrease in the transmission rate is not meaningful (NO in S64, YES in S92), a higher transmission rate (Refer to a large increased width U in S65 and S94) may be designated.

When it is judged that the decrease in the transmission rate is meaningful, transmission at the lower transmission rate is performed to keep the merit such as improvement of the packet loss rate. When it is judged that the decrease in the transmission rate is not meaningful, transmission at the higher transmission rate is performed to improve the quality of a video transmitted in the third transmission. This can achieve both of improvement of the packet loss rate and high video quality.

In this manner, the proper increase amount achieving the transmission rate that enables improvement of the packet loss rate and high video quality can be properly determined.

The transmission rate determining unit may be configured to determine an amount of increase in the transmission rate and increase the transmission rate by the determined increase amount, the increase amount being smaller as the amount of change of the packet loss rate and the jitter are larger.

In the case where at least either the packet loss rate or the jitter is improved as a result of the decrease in the transmission rate, the transmitting device gradually increases the transmission rate. On the contrary, in the case where both of the packet loss rate and the jitter do not improve even after the decrease in the transmission rate, the video quality is recovered by rapidly increasing the transmission rate of the packet. If the packet loss rate or the jitter is not improved, it is preferred to recover the video quality by early recovering the transmission rate. Accordingly, it can be prevented that the transmission rate is not recovered after the decrease in the transmission rate while keeping excessively low. As a result, the transmitting device can suppress the degradation of the video quality and properly determine the transmission rate.

Specifically, the transmission rate determining unit may be configured to acquire the amount of change of the packet loss rate from information indicating the packet loss rate of the communication packet, the information being included in the feedback packet.

Thus, the transmission rate determining unit can acquire the packet loss rate of the communication packet transmitted to the receiving device. Accordingly, the amount of change of the packet loss rate can be acquired from a difference between two packet loss rates acquired at two different times.

The transmission rate determining unit may be configured to acquire the amount of change of the jitter by measuring one-way delay of the communication channel before and after the decrease in the transmission rate.

Specifically, the transmission rate determining unit may be configured to determine the increase amount of the transmission rate to be a predetermined value in the case where both of the amount of change of the packet loss rate and the jitter are smaller than a predetermined threshold (first case), determines the increase amount of the transmission rate to be a half of the predetermined value in the case where either the amount of change of the packet loss rate or the jitter is larger than or equal to its predetermined threshold (second case), and determines the increase amount of the transmission rate to be a quarter of the predetermined value in the case where both of the amount of change of the packet loss rate and the jitter are larger than or equal to the respective predetermined thresholds (third case). The first case is, for example, a case where the amount of change of the packet loss rate is smaller than a first threshold and the jitter is also smaller than a second threshold. The second case is, for example, a case where either the amount of change of the packet loss rate or the jitter is larger than or equal to its threshold. The third case is, for example, a case where both the amount of change of the packet loss rate and the jitter are larger than or equal to their respective thresholds.

More specifically, the transmission rate determining unit may be configured to determine a predetermined value as the increase amount of the transmission rate in the case where the amount of change of the packet loss rate is smaller than a first threshold and the jitter is smaller than a second threshold, determine the increase amount of the transmission rate to be a half of the predetermined value in the case where the amount of change of the packet loss rate is smaller than the first threshold and the jitter is larger than or equal to the second threshold and is smaller than a third threshold, and determine the increase amount of the transmission rate to be a quarter of the predetermined value in the case where the amount of change of the packet loss rate is smaller than the first threshold and the jitter is larger than or equal to the third threshold.

The transmission rate determining unit may be configured to estimate a buffer amount of the communication channel, and determine the increase amount of the transmission rate to be smaller as the jitter and the amount of change of the packet loss rate are larger, and as a value obtained by dividing the buffer amount by the transmission rate is smaller.

Thus, the transmitting device determines the transmission rate so as to make the increase amount of the transmission rate smaller as a period when the transmitted communication packet is buffered in the communication channel is smaller. Therefore, the transmitting device can determine the proper transmission rate taking into the characteristic of the communication channel into consideration.

Specifically, the transmission rate determining unit may be configured to determine the increase amount of the transmission rate to be a first increase amount determined based on a state of the communication channel, in the case where the jitter is smaller than a value obtained by dividing the buffer amount by the transmission rate, determine the increase amount of the transmission rate to be a half of the first increase amount in the case where the jitter is larger than or equal to the value obtained by dividing the buffer amount by the transmission rate, and is smaller than twice the value obtained by dividing the buffer amount by the transmission rate, and determine the increase amount of the transmission rate to be a quarter of the first increase amount in the case where the jitter is larger than or equal to twice the value obtained by dividing the buffer amount by the transmission rate.

A transmitting device according to another aspect of the present invention is a transmitting device that transmits a communication packet to a receiving device via a communication channel, the transmitting device including: a transmitting unit configured to transmit the communication packet to the receiving device; a receiving unit configured to receive, from the receiving device, a feedback packet that is a response signal corresponding to the communication packet; a detecting unit configured to detect a change of a reception interval of the feedback packet; and a transmission rate determining unit configured to decrease a transmission rate at which the transmitting unit transmits the communication packet in the case where the change of the reception interval is detected, and to increase the transmission rate on the basis of an amount of change of a travelling speed of at least either the transmitting device or the receiving device, before and after the decrease in the transmission rate.

With this configuration, in the case where at least either the transmitting device or the receiving device travels, for example, is connected to a wireless bas station device having a different communication rate, even when the characteristic of the communication channel vary with the travelling, the transmission rate can be properly determined.

Specifically, the transmission rate determining unit may be configured to determine an amount of increase in the transmission rate and increase the transmission rate by the determined increase amount, the increased amount being larger as the amount of change of the travelling speed of at least either the transmitting device or the receiving device, before and after the decrease in the transmission rate, is smaller.

As described above, the transmitting device from the first aspect uses the amount of change of the packet loss rate and the amount of change of the transmission time, and the transmitting device from the second aspect uses the amount of change of the travelling speed. Both of the two transmitting devices use the amount of change (the amount of change of the packet loss rate, the jitter, and the amount of change of the travelling speed) before and after the decrease in the transmission rate, which indicates whether or not the decrease is meaningful. The proper increase amount can be determined based on the amount of change. The two transmitting devices have common configuration, action, and effect and therefore, fall within the single technical scope.

More specifically, the transmission rate determining unit may be configured to determine the increase amount of the transmission rate to be a predetermined value in the case where the amount of change of the travelling speed is smaller than or equal to a predetermined threshold, and determine the increase amount of the transmission rate to be a half of the predetermined value in the case where the amount of change of the travelling speed is larger than the predetermined threshold.

The transmission rate determining unit may acquire the travelling speed of at least either the transmitting device or the receiving device by using one of more of data acquired from a GPS (Global Positioning System), a change of information on a base station in the communication channel to which the transmitting device is connected, a change of intensity of an electrical wave received by the transmitting device via the communication channel, and information on the travelling speed of the receiving device, which is acquired from the receiving device.

Thereby, the transmitting device can correctly acquire its travelling speed.

These general or specific modes may be implemented by a system, a method, an integrated circuit, a computer program, or a recording medium, or may be implemented by any combination of the system, the method, the integrated circuit, the computer program, and the recording medium.

The present invention can be realized as such transmitting device, as well as a transmitting method including steps as characteristic units included in the transmitting device, and a program for causing a computer to perform the characteristic steps. As a matter of course, such program can be distributed in recording media such as CD-ROMs (Compact Disc Read Only Memory) or via transmission media such as the Internet.

The present invention can be realized as a semiconductor integrated circuit (LSI) that perform a part or whole of functions of such transmitting device, or a transmission system including such transmitting device.

According to the present invention, even when the transmission rate reduction processing is executed at retransmission of the MAC layer in the wireless communication environment, the transmission rate can be rapidly recovered. This can improve the video quality in the wireless communication environment.

Moreover, the present invention provides the transmitting device capable of suppressing the degradation of the video quality and determining the proper transmission rate and therefore, in these days when AV transmission becomes widespread, this technique has extremely high practical worth.

Embodiments of the present invention will be described below with reference to figures.

The below-mentioned embodiments each show one specific example of the present invention. Numeric values, shape, materials, components, arrangement and connection of the components, steps, and the order of steps in the below-mentioned embodiments are merely examples, and do not intend to limit the present invention. The present invention is limited by only Claims. Among the components in the following embodiments, components that are not recited in independent Claims are not essential to implement the present invention, but are described as components constituting the specific example.

Embodiment 1

FIG. 1 is a view showing a configuration of a network system 100 to which the present invention is applied.

As shown in FIG. 1, the network system 100 includes a transmitting device 11, a communication channel 12, and a receiving device 13. The transmitting device 11 transmits a communication packet 14 to the receiving device 13 via the communication channel 12. The transmitting device 11 also receives a feedback packet 15 that is a response signal corresponding to the communication packet 14 transmitted from the receiving device 13 via the communication channel 12. The communication packet 14 is, for example, a video packet including a video signal.

Describing in more detail, for example, the transmitting device 11 is connected to the receiving device 13 for receiving the video packet through the communication channel 12. The transmitting device 11 transmits the communication packet 14 as the video packet according to an RTP (Real-time Transport Protocol). The receiving device 13 processes information on communication quality, such as a loss rate of the received communication packet 14. In this processing, the information is included in the feedback packet 15, and transmitted to the transmitting device 11 according to an RTCP (RTP Control Protocol). Based on the information included in the received feedback packet 15, the transmitting device 11 performs calculation based on a TFRC (TCP Friendly Rate Control) to estimate the degree of congestion of the communication channel 12. Based on an estimation result, the transmitting device 11 determines the transmission rate of the communication packet. The transmission rate means an amount of information transmitted from the transmitting device 11 to receiving device 13 per unit time.

Specific embodiments of the present invention will be described in more detail.

Figure 2:
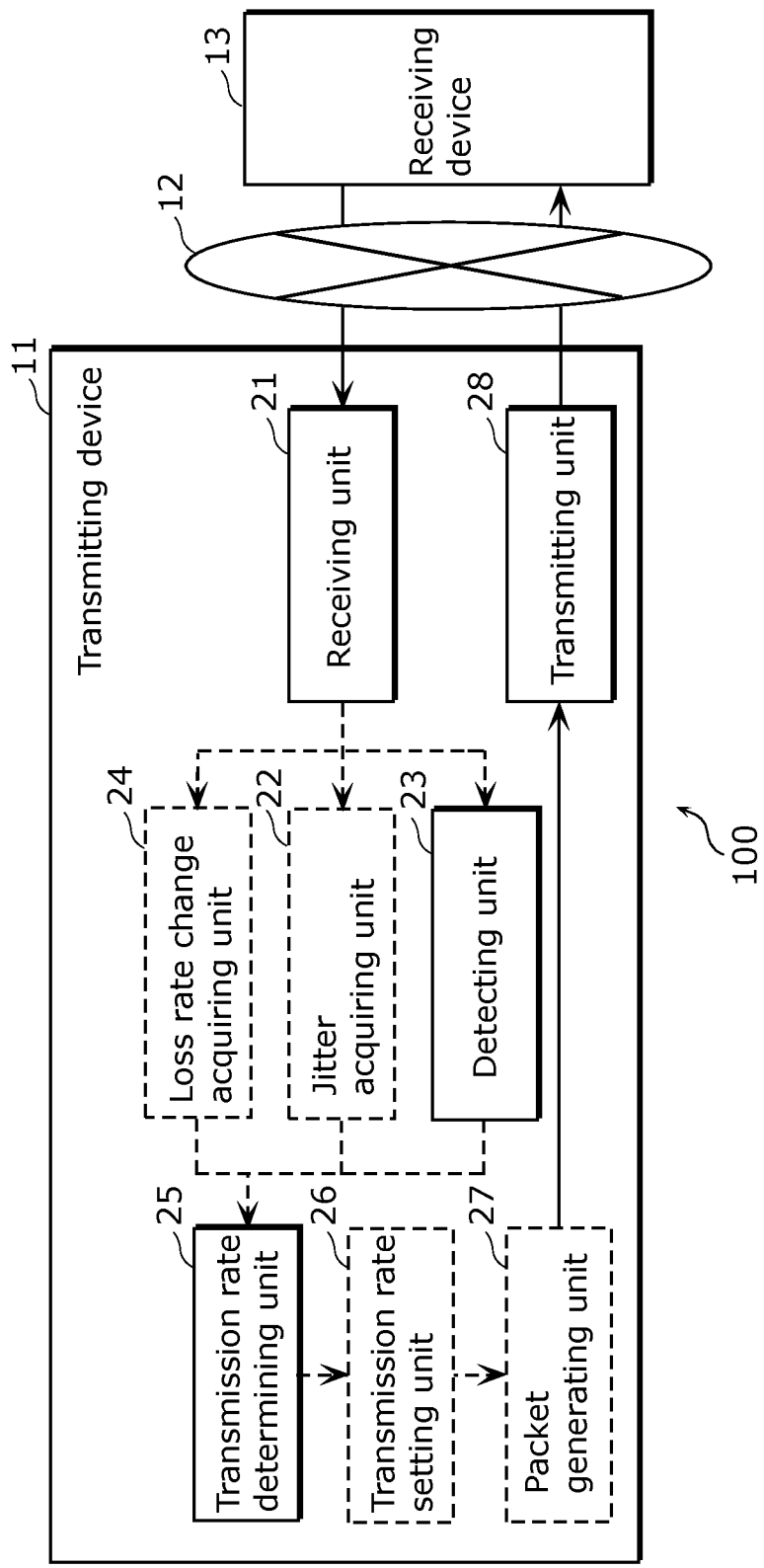
FIG. 2 is a block diagram showing a configuration of a transmitting device in accordance with Embodiment 1.

FIG. 2 is a block diagram showing a configuration of a transmitting device 11 in accordance with Embodiment 1 of the present invention. In FIG. 2, solid lines each connecting two units to each other represent transfer of packet between the two units, and dotted lines each represent a flow of a control signal.

As shown in FIG. 2, the transmitting device 11 that transmits the communication packet to the receiving device 13 via the communication channel 12 includes a receiving unit 21, a jitter acquiring unit 22, a detecting unit 23, a loss rate change acquiring unit 24, a transmission rate determining unit 25, a transmission rate setting unit 26, a packet generating unit 27, and a transmitting unit 28.

The receiving unit 21 is a communication interface that receives the feedback packet, which is the response signal corresponding to the communication packet, from the receiving device 13 via the communication channel 12. The communication channel 12 is, for example, wireless LAN (Local Area Network), mobile phone line, or wired LAN, but is not limited to these. The receiving unit 21 may function as a queue that stores the received packet for each flow or source.

The jitter acquiring unit 22 acquires a jitter that is an amount of change of a transmission time of the communication packet transmitted from the transmitting device 11 to the receiving device 13. For example, the jitter acquiring unit 22 measures one-way delay time of the communication channel at each time when the transmission rate determining unit 25 decreases the transmission rate. After the measurement, the transmission rate determining unit 25 acquires the jitter as a difference between the two measured one-way delay times. For example, the acquired jitter refers to a time obtained by subtracting the transmission time measured at the latter time from the transmission time measured at the former time. Details will be described later.

The detecting unit 23 detects a change of a reception interval of the feedback packet.

The loss rate change acquiring unit 24 acquires an amount of change of the packet loss rate. The packet loss rate refers to a rate of the communication packet that is not correctly transmitted to the communication packets transmitted from the transmitting device 11 to the receiving device 13. As described later, there are two feedback packets acquired at two times before and after the transmission rate determining unit 25 decreases the transmission rate. For example, each of the feedback packets includes information on the packet loss rate. For example, the loss rate change acquiring unit 24 acquires the amount of change of the packet loss rate on the basis of the two pieces of information.

In the case where the change of the reception interval is detected, the transmission rate determining unit 25 decreases the transmission rate at which the transmitting unit 28 transmits the communication packet. The transmission rate is increased based on the amount of change of the packet loss rate, which indicates the loss rate of the communication packet, and the jitter, which is the amount of change of the transmission time of the communication packet, before and after the decrease in the transmission rate. Specifically, the transmission rate determining unit 25 determines an increase amount of the transmission rate to be smaller as each of the amount of change of the packet loss rate and the jitter is larger. After that, the transmission rate determining unit 25 increases the transmission rate by the increase amount thus determined. That is, the transmission rate determining unit 25 calculates the transmission rate by determining a reduced amount of the transmission rate in a reduction step of decreasing the transmission rate, or a recovery width of the transmission rate after execution of the reduction step.

For example, in the case where the transmitting device 11 transmits the video signal, the transmission rate setting unit 26 sets the transmission rate increased by the increase amount determined by the transmission rate determining unit 25, to an encoder. Through this processing, the transmission rate setting unit 26 adjusts the rate of encoding.

Based on the increase amount of the transmission rate, which is determined by the transmission rate determining unit 25, the packet generating unit 27 generates the communication packet such as the video packet.

Like the receiving unit 21, the transmitting unit 28 is a communication interface that transmits the communication packet to the receiving device 13 at the transmission rate determined by the transmission rate determining unit 25. The transmitting unit 28 may function as a queue that stores data for each flow or destination.

More details will be described below.

When a packet arrives, the receiving unit 21 stores the arrived packet. The detecting unit 23 monitors the packet loss rate by calculating the reception interval of the feedback packet from information on the stored packet. At this time, in the case where, within a certain time from reception of a previous feedback packet, a next packet does not arrive, the detecting unit 23 notifies time-out to the transmission rate determining unit 25. When receiving the notification of time-out from the detecting unit 23, the transmission rate determining unit 25 executes transmission rate reduction processing. Then, the transmission rate determining unit 25 sets the transmission rate that is smaller than the transmission rate before the notification of time-out to the transmission rate setting unit 26.

After an elapse of a certain time from start of the transmission rate reduction processing, the state of the transmission rate determining unit 25 is shifted to a state in which transmission rate recovery processing is ready. At this time, the loss rate change acquiring unit 24 acquires a next amount of change. The acquired amount of change is an amount of change of the packet loss rate between the packet loss rate before execution of the reduction processing and the packet loss rate after execution of the reduction processing. After the acquisition, the loss rate change acquiring unit 24 notifies the acquired amount of change of the packet loss rate to the transmission rate determining unit 25.

Similarly, the jitter acquiring unit 22 acquires the above-mentioned jitter before and after the execution of the reduction processing. After that, the jitter acquiring unit 22 notifies the acquired jitter to the transmission rate determining unit 25.

The transmission rate determining unit 25 calculates the increase amount, which is the recovery width of the transmission rate, from the amount of change of the packet loss rate and the jitter. After that, the transmission rate determining unit 25 sets the calculated increase amount of the transmission rate to the transmission rate setting unit 26.

Based on the transmission rate set by the transmission rate setting unit 26, the packet generating unit 27 generates an encoded video packet. After that, the packet generating unit 27 transfers the generated video packet to the transmitting unit 28. The transferred packet is transmitted from the transmitting unit 28 to the receiving device 13 via the communication channel 12 at the transmission rate determined by the transmission rate determining unit 25.

Figure 3:
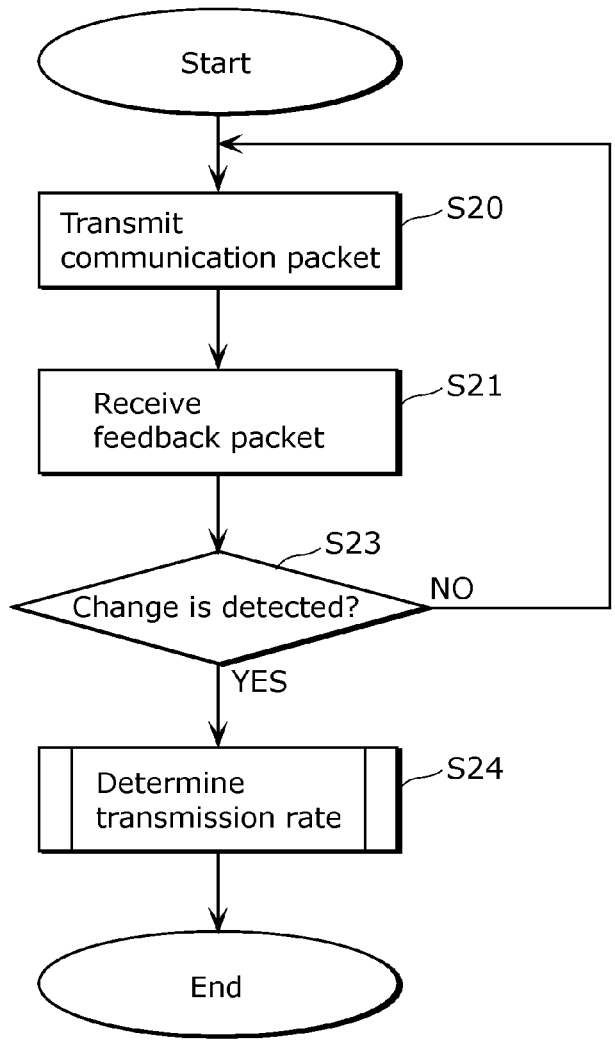
FIG. 3 is a flow chart showing summary of flow of processing of the transmitting device in accordance with Embodiment 1.

FIG. 3 is a flow chart showing summary of flow of processing of the transmitting device 11 in accordance with this embodiment.

First, the transmission rate determining unit 25 transmits the communication packet to the receiving device 13 (Step S20).

Next, when the transmitting device 11 receives the feedback packet from the receiving device 13 (Step S21), the detecting unit 23 detects a change of the packet loss rate of the communication packet transmitted to the receiving device 13, on the basis of information included in the feedback packet (Step S23).

When no change of the packet loss rate is detected (NO in Step S23), the feedback packet is received again (loop to Step S21).

When the change of the packet loss rate is detected (YES in Step S23), the transmission rate determining unit 25 determines the transmission rate (Step S24). Specifically, after the transmission rate is decreased once, the transmission rate is increased by the increase amount determined based on the amount of change of the packet loss rate and the jitter.

With reference to FIG. 4 to FIG. 7, processing of the transmission rate determining unit 25 in Step S24 will be described below in more detail.

Figure 4:
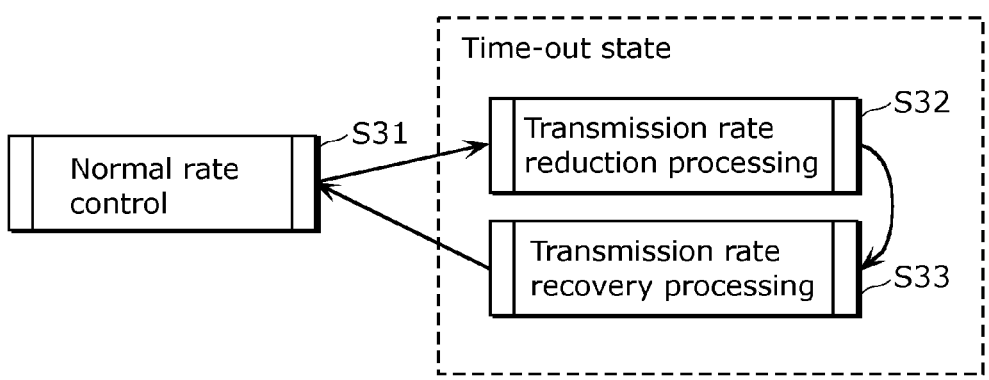
FIG. 4 is a state transition view of a transmission rate determining unit in accordance with Embodiment 1.

FIG. 4 is a state transition view at the time when the transmission rate determining unit 25 calculates the transmission rate.

According to an algorithm for calculating the transmission rate, at start of communication, the transmission rate determining unit 25 first starts rate calculation processing in normal rate control (Step S31). Next, each time the feedback packet arrives, the transmission rate determining unit 25 updates a calculated value of the transmission rate in the normal rate control (Step S31).

In the case where the feedback packet does not arrive for a certain time, the normal rate control (Step S31) is transitioned to the transmission rate reduction processing (Step S32). Then, the transmission rate determining unit 25 decreases the transmission rate.

When a certain time has passed after transition to the transmission rate reduction processing (Step S32), the transmission rate reduction processing is transitioned to the transmission rate recovery processing (Step S33), and the increase amount of the transmission rate is determined according to the amount of change of the packet loss rate and the jitter. Then, the determined increase amount of the transmission rate is set to the transmission rate setting unit 26. After the transmission rate is set to the transmission rate setting unit 26, the transmission rate recovery processing is transitioned to the normal rate control (Step S31). Following the transition, the transmission rate determining unit 25 recalculates the transmission rate in the normal rate control.

Figure 5:
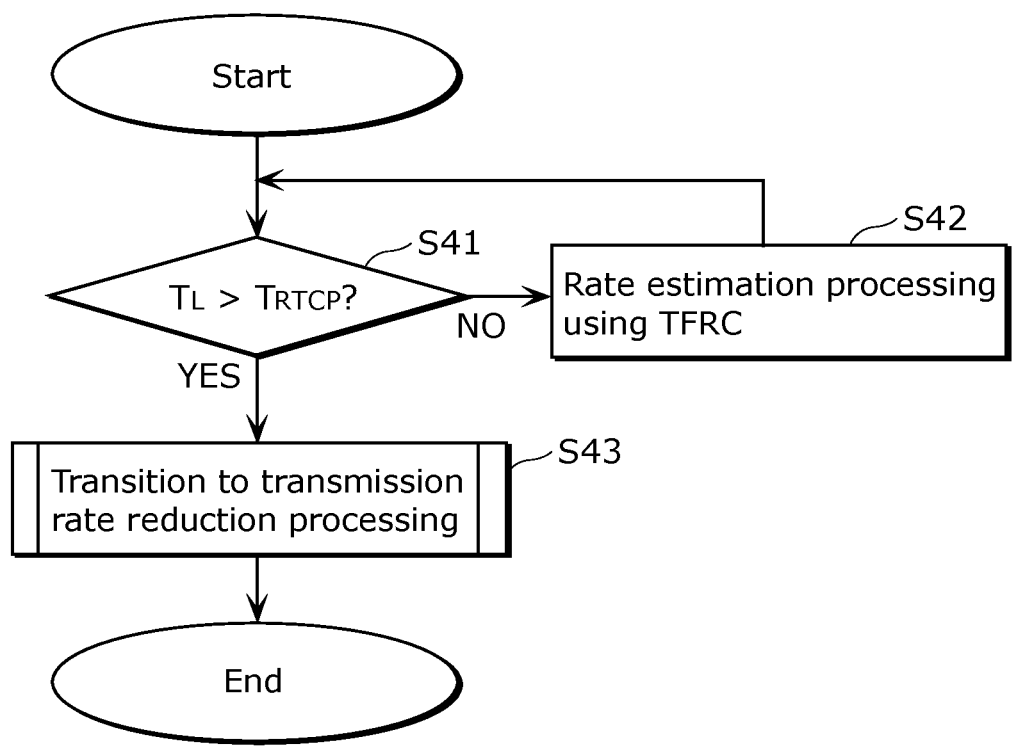
FIG. 5 is a flow chart showing flow of normal rate control processing in accordance with Embodiment 1.

FIG. 5 is a detailed flow chart of normal rate control processing (Step S31 in FIG. 4) of the transmission rate determining unit 25 in accordance with this embodiment.

When the normal rate control processing in Step S31 in FIG. 4 is started, first, in Step S41, at every constant cycle, it is judged whether or not a time length $T_L$, which is a difference between a current time and a time when the feedback packet is received last, exceeds a threshold $T_{RTCP}$.

When the $T_L$ is larger than the $T_{RTCP}$ (YES in S41), the procedure transitions to the transmission rate reduction processing (Step S43). When the $T_L$ is not larger than the TRTCP (NO in S41), following Equation (1) is solved in Step S42, thereby executing rate estimation processing using the TFRC.

Equation (1) is as follows.

[Math. 1]

$$X = \frac{S}{R \times \sqrt{\frac{2p}{3}} + (4 \times R)\left(3\sqrt{\frac{3p}{8}}\right)p(1+32p^2)} \quad 式\ (1)$$

Meaning of characters in Equation (1) is as follows.
X: Transmission rate
R: Round trip time (reciprocating delay time)
S: Packet size
P: Packet loss rate That is, in the normal rate control, as represented by Equation (1), the transmission rate determining unit 25 sequentially determines the transmission rate on the basis of the state of the communication channel.

Figure 6:
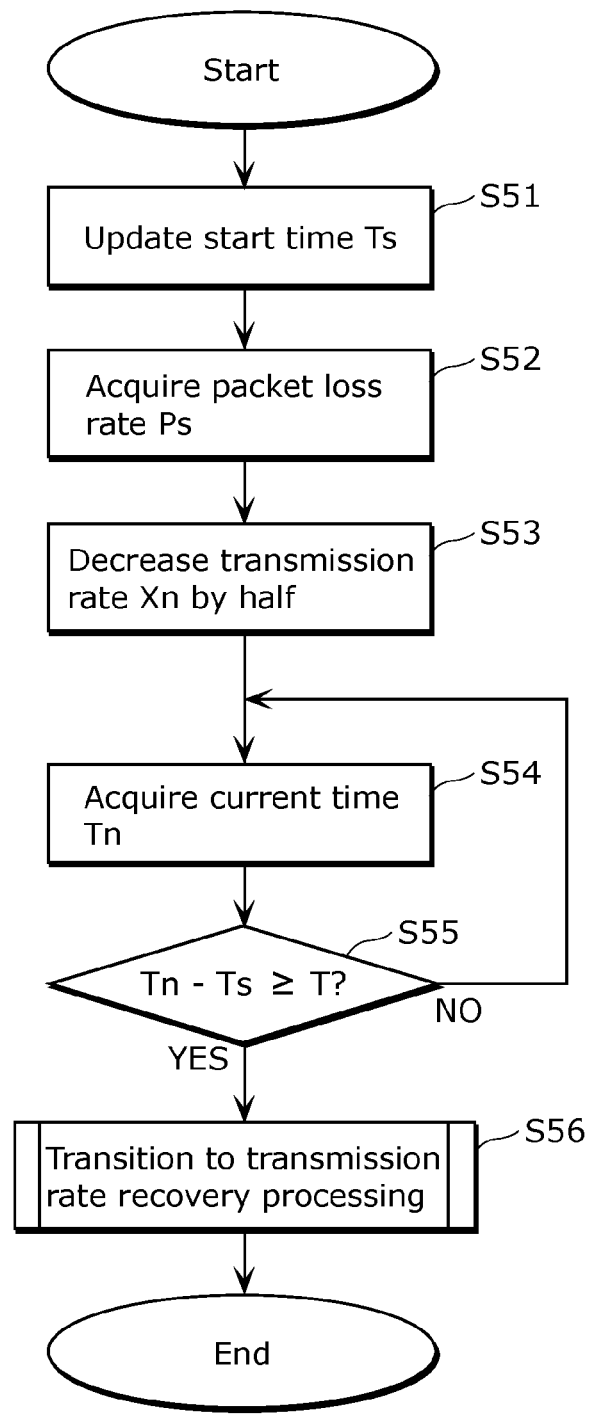
FIG. 6 is a flow chart showing flow of transmission rate reduction processing in accordance with Embodiment 1.

Next, FIG. 6 is a detailed flow chart of the transmission rate reduction processing (Step S32 in FIG. 4) of the transmission rate determining unit 25 in accordance with this embodiment. This processing is executed at transition to S43 in FIG. 5.

When reduction of the transmission rate is started, in Step S51, the transmission rate determining unit 25 first updates a start time $T_s$. Next, in Step S52, a packet loss rate $P_s$ that is a packet loss rate before decrease in the transmission rate is acquired. Next, in Step S53, a transmission rate $X_n$ is set to a half of a transmission rate Xp before reduction, which is calculated by Equation (1), ($X_n=(½)\times Xp$), and the transmission rate $X_n$ is notified to the transmission rate setting unit 26. Next, in Step S54, a current time $T_n$ is acquired. Next, in Step S55, it is judged whether or not a difference $T_n-T_s$ between the current time $T_n$ and the start time $T_s$ is larger than or equal to a threshold T.

In the case where it is judged that the difference $T_n-T_s$ is larger than or equal to the threshold T (YES in S55), the procedure transitions to the transmission rate recovery processing (Step S56). On the contrary, in the case where the difference $T_n-T_s$ is smaller than the threshold T, after an elapse of a certain time, the calculations in Step S54 and Step S55 are repeated. That is, in Step S54, S55, processing as a wait timer that waits for a time corresponding to the threshold T from the time Ts is executed.

Figure 7:
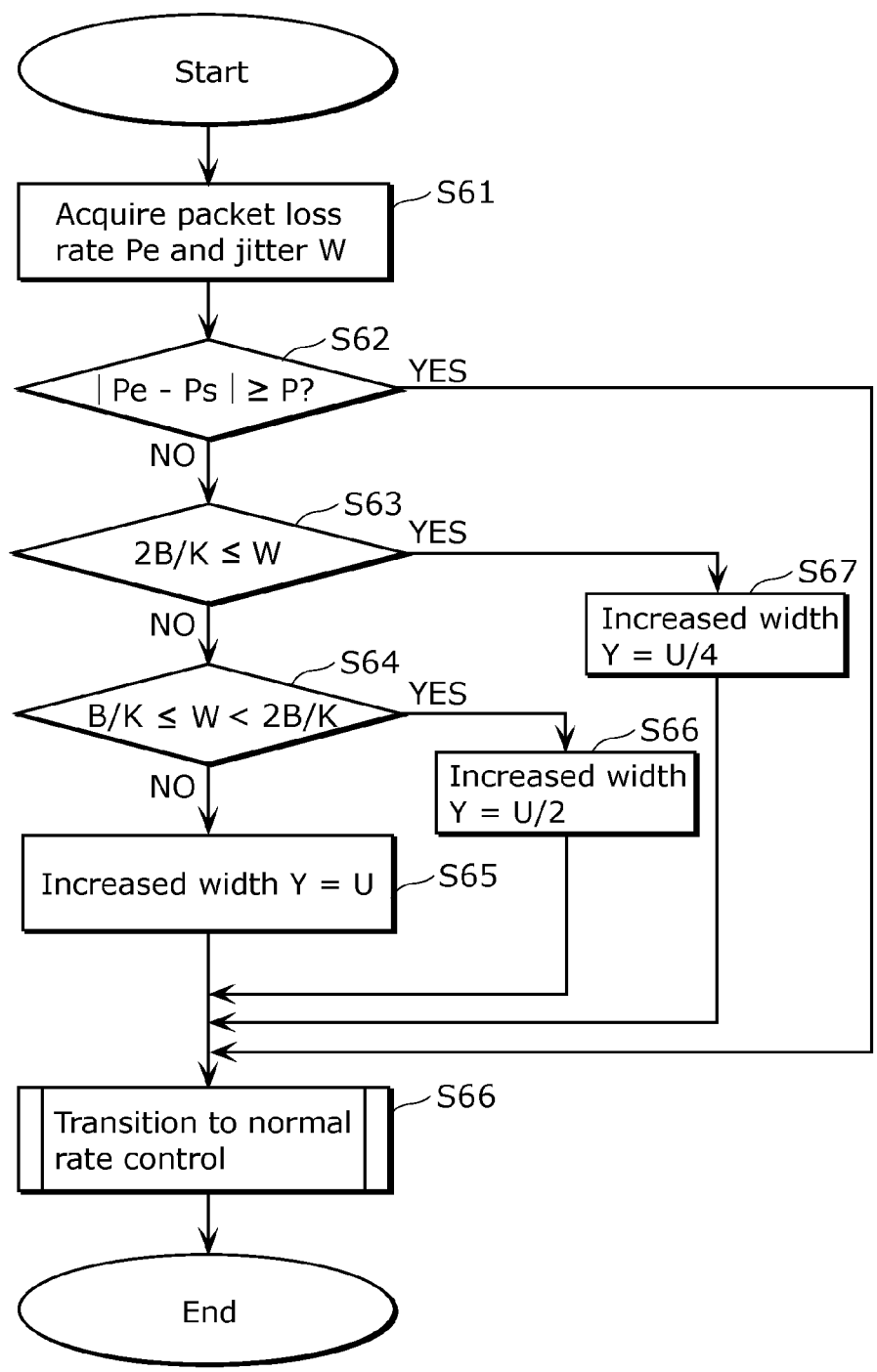
FIG. 7 is a flow chart showing flow of transmission rate recovery processing in accordance with Embodiment 1.

FIG. 7 is a detailed flow chart of the transmission rate recovery processing (Step S33 in FIG. 4) of the transmission rate determining unit 25 in accordance with this embodiment. This processing is executed at the transition in Step S56 in FIG. 6.

First, in Step S61, the transmission rate determining unit 25 acquires a packet loss rate $P_e$ after decrease in the transmission rate. The transmission rate determining unit 25 further acquires a jitter W that is the amount of change of the transmission time, before and after the decrease in the transmission rate. The acquired jitter W is the amount of change of one-way delay caused at transmission of the communication packet from the transmitting device 11 to the communication channel 12. At this time, the jitter W is calculated, for example, according to Equation (2).

[Math. 2]

$$W=(R_a-R_b)-(S_a-S_b) \quad 式\ (2)$$

Meaning of characters in Equation (2) is as follows.
$R_a$: Reception time of packet acquired this time
$R_b$: Reception time of packet acquired at timing in Step S51 in FIG. 6 (time Ts)
$S_a$: Transmission time of packet acquired this time
$S_b$: Transmission time of packet acquired at timing in Step S51 in FIG. 6 (time $T_s$)

In this embodiment, as represented by Equation (2), the jitter W is calculated using extension of the one-way delay (that is, difference of one-way delays). However, a following method may be adopted. According to the method, the delay time is subjected to statistical processing such as distribution or hysteresis to obtain a value, and the value thus obtained is used. The jitter W may be calculated according to this method.

Next, in Step S62, the transmission rate determining unit 25 calculates a value $|P_e-P_s|$, which is the amount of change of the packet loss rate, from the packet loss rate $P_s$ acquired in Step S52 in the reduction processing (FIG. 6) and the $P_e$ acquired in Step S61. The transmission rate determining unit 25 further compares the values $P_s$ and $P_e$ with each other to judge whether or not the value $|P_e-P_s|$ larger than or equal to a threshold P of the packet loss rate.

Here, in the case where $|P_e-P_s|$ is larger than or equal to P (YES in Step S62), the transmission rate recovery processing is transitioned to the normal rate control (S31 in FIG. 4) (Step S66), and the transmission rate determining unit 25 uses the transmission rate of the TFRC, which is calculated according to Equation (1) in Step S42, as a subsequent transmission rate.

On the contrary, in the case where $|P-P_s|$ is smaller than P (NO in Step S62), in Step S63, the transmission rate determining unit 25 compares the jitter W with a buffer amount B estimated to be held by the communication channel 12 and an index 2B/K calculated from a current transmission rate K. The buffer amount B estimated to be held by the communication channel 12 is previously calculated, for example, according to following Equation (3). A transmission rate immediately before the increase in the transmission rate by the transmission rate recovery processing is K1. A time corresponding to the $K_1$ is $T_1$. A transmission rate after the increase in the transmission rate by the transmission rate recovery processing is $K_2$. A time when the detecting unit 23 first detects a packet loss after the increase to the transmission rate $K_2$ is $T_2$.

$$B=(K_2-K_1)\times(T_2-T_1) \qquad\qquad \text{Equation (3)}$$

More specifically, in the case where 2B/K is smaller than or equal to W (YES in Step S63), in Step S67, the transmission rate determining unit 25 sets an increase width Y, which is the increase amount of the transmission rate, to U/4. It is assumed that U is a value necessary for recovering the transmission rate from the transmission rate $X_n=(½)\times Xp$ after the transmission rate reduction processing to the transmission rate Xp before reduction. That is, $U=Xp-(½)\times Xp=(½)\times Xp$.

In the case where 2B/K is larger than W (NO in Step S63), the transmission rate determining unit 25 proceeds to processing in Step S64. In Step S64, a relationship: B/K<W<2B/K is satisfied (YES in Step S64), in Step S66, the transmission rate determining unit 25 sets the increase width Y, which is the increase amount of the transmission rate, to U/2. On the contrary, the relationship: B/K<W<2B/K is not satisfied (NO in Step S64), in Step S65, the transmission rate determining unit 25 sets the increase width Y, which is the increase amount of the transmission rate, to U.

After that, irrespective of the judgment results in Step S62, S63, S64, and S65, the transmission rate determining unit 25 proceeds to the normal rate control (Step S31). Next, the transmission rate determining unit 25 calculates a next transmission rate according to Equation (1).

The transmission rate determining unit 25 can decrease the transmission rate and determine the proper increase amount of the transmission rate at recovery after the decrease, while repeating transition among the above-mentioned three states in Step S31, S32, and S33.

That is, in the case where the amount of change of the packet loss rate and the jitter are smaller than the respective predetermined thresholds (the amount of change of the packet loss rate is smaller than a first threshold and the jitter is smaller than a second threshold), the transmission rate determining unit 25 may determine the increase amount of the transmission rate to a predetermined value. In the case where either of the amount of change of the packet loss rate or the jitter is larger than or equal to its predetermined threshold, the transmission rate determining unit 25 may determine the increase amount of the transmission rate to a half of the predetermined value. In the case where both the amount of change of the packet loss rate and the jitter are larger than or equal to the respective predetermined thresholds, the transmission rate determining unit 25 may determine the increase amount of the transmission rate to be a quarter of the predetermined value.

More specifically, in the case where the amount of change of the packet loss rate is smaller than the first threshold, and the jitter is smaller than the second threshold, the transmission rate determining unit 25 determines the increase amount of the transmission rate to be the predetermined value, and in the other cases, following processing may be executed. That is, in the case where the amount of change of the packet loss rate is smaller than the first threshold, and the jitter is larger than or equal to the second threshold and is smaller than a third threshold, the transmission rate determining unit 25 determines the increase amount of the transmission rate to a half of the predetermined value. In the case where the amount of change of the packet loss rate is smaller than the first threshold, and the jitter is larger than or equal to the third threshold, the transmission rate determining unit 25 determines the increase amount of the transmission rate to be a quarter of the predetermined value. In the case where the amount of change of the packet loss rate is larger than or equal to the first threshold, the transmission rate determining unit 25 determines the increase amount of the transmission rate to 0.

Further, the transmission rate determining unit 25 may estimate the buffer amount of the communication channel 12, and determine the increase amount of the transmission rate to be smaller as each of the jitter and the amount of change of the packet loss rate is larger. Alternatively, the transmission rate determining unit 25 may determine the increase amount of the transmission rate to be smaller as a value obtained by dividing the buffer amount by the transmission rate is smaller.

More specifically, in the case where the jitter is smaller than the value obtained by dividing the buffer amount by the transmission rate, the transmission rate determining unit 25 may determine the increase amount of the transmission rate to be a first increase amount determined based on the state of the communication channel 12. In the case where the jitter is larger than or equal to the value obtained by dividing the buffer amount by the transmission rate, and is smaller than twice the value obtained by dividing the buffer amount by the transmission rate, the transmission rate determining unit 25 may determine the increase amount of the transmission rate to be a half of the first increase amount. In the case where the jitter is larger than or equal to twice the value obtained by dividing the buffer amount by the transmission rate, the transmission rate determining unit 25 may determine the increase amount of the transmission rate to a quarter of the first increase amount.

With the above-mentioned configuration, in the case where the packet loss rate or the jitter is hardly improved as a result of the decrease in the transmission rate (S52 in FIG. 6) (Refer to YES in S62 in FIG. 7), the transmitting device 11 in accordance with this embodiment can rapidly recover the packet transmission rate. Accordingly, it can be prevented that after being decreased once, the transmission rate is not easily recovered while keeping excessively low. As a result, the transmitting device 11 can suppress the degradation of the video quality at recovery and properly determine the transmission rate.

In Embodiment 1, the transmitting device 11 includes the jitter acquiring unit 22 and the loss rate change acquiring unit 24 in addition to the transmission rate determining unit 25. However, in place of the jitter acquiring unit 22, the transmission rate determining unit 25 may acquire the amount of change of the packet loss rate. The amount of change may be acquired based on the packet loss rates included in two feedback packets acquired before and after the decrease in the transmission rate. Similarly, in place of the loss rate change acquiring unit 24, the transmission rate determining unit 25 may measure the one-way delay of the communication channel before and after the decrease in the transmission rate, thereby acquiring the jitter as the difference of the one-way delays. In this case, even when the jitter acquiring unit 22 and the loss rate change acquiring unit 24 are not provided in addition to the transmission rate determining unit 25, the transmitting device 11 can achieve the same effects.

In the case where the transmitting device 11 transmits, for example, a packet having predetermined contents, as the communication packet, not the video signal, the transmitting device 11 does not need to execute processing such as encoding of transmission data and packet generation. Therefore, in such case, even when the transmission rate setting unit 26 and the packet generating unit 27 are not provided, the transmitting device 11 can achieve the same effects.

Embodiment 2

As described above, in the transmitting device 11 in accordance with Embodiment 1, the transmission rate determining unit 25 determines an increase amount of the transmission rate on the basis of the amount of change of the packet loss rate and the jitter. In Embodiment 2 of the present invention, a transmission rate determining unit 25A determines the increase amount of the transmission rate on the basis of the amount of change of a travelling speed of a communication device. The communication device is a generic term of the transmitting device 11 and the receiving device 13. The travelling speed of the communication device is calculated by a travelling speed acquiring unit 77.

First, with reference to FIG. 8, a specific example of a problem assumed in this embodiment will be described below.

Figure 8:
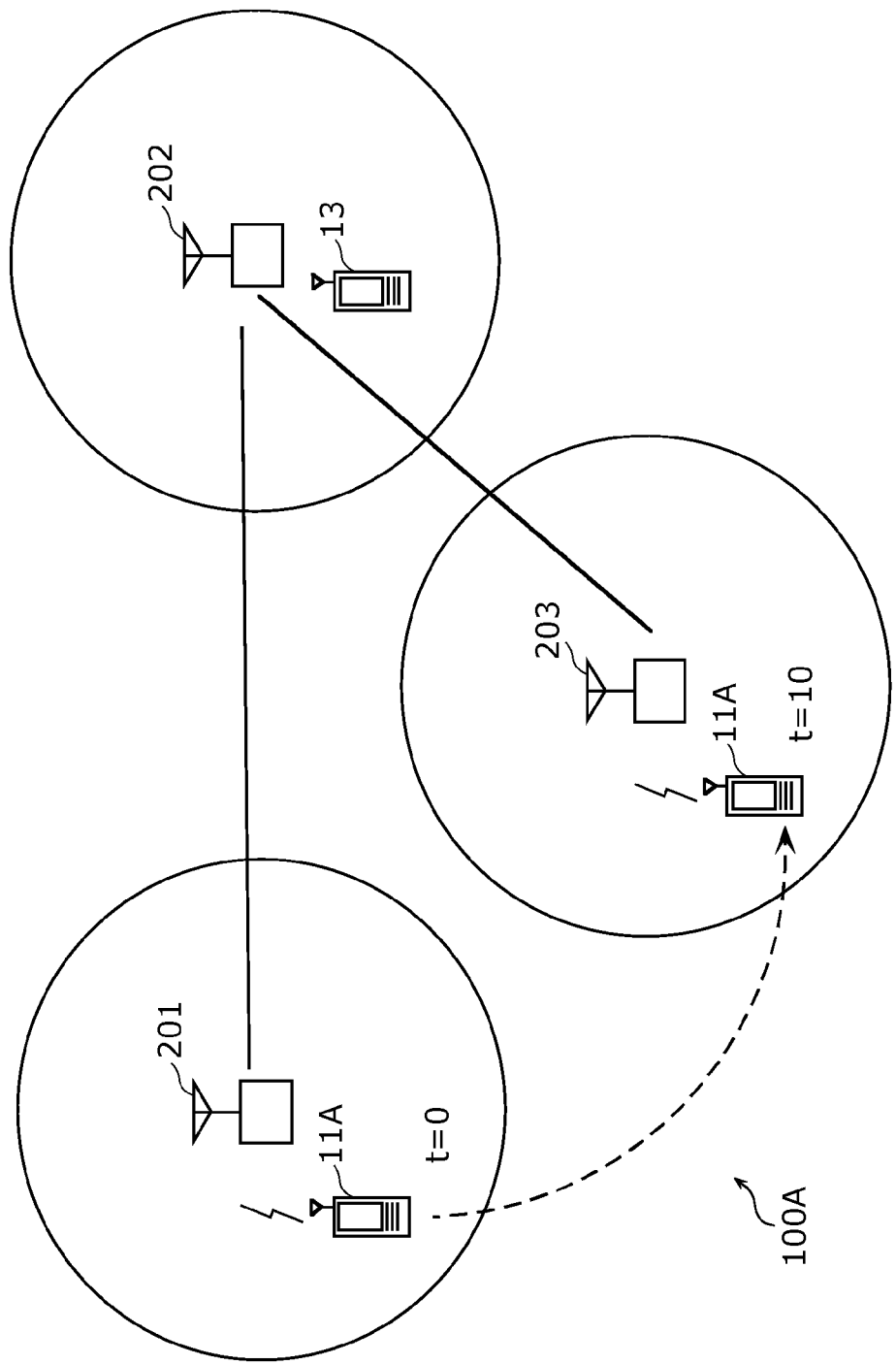
FIG. 8 is a view showing an example of a network system for describing a problem assumed in Embodiment 2.

FIG. 8 shows a network system 100A as an example of a network system assumed in this embodiment. The network system 100A solves a problem in a conventional example. The network system 100A includes a transmitting device 11A, a receiving device 13, a base station device 201, a base station device 202, and a base station device 203.

The transmitting device 11A is a transmitting device in accordance with this embodiment and details thereof are omitted.

The receiving device 13 is a communication device that receives a communication packet from the transmitting device 11A, and transmits a feedback packet to the transmitting device 11A in response to the communication packet.

The base station device 201 to base station device 203 are so-called wireless base stations that each relay wireless communication between the transmitting device 11A and the receiving device 13. Each of the wireless base stations is connected to a backbone line. It is assumed that a bandwidth available for the base station device 201 to communicate with any communication device in a communication area of the base station device 201 is larger than a bandwidth available for the base station device 203 to communicate with any communication device in a communication area of the base station device 203.

At Time t=0, the transmitting device 11A is located in the communication area of the base station device 201, and the receiving device 13 is located in the communication area of the base station device 202. It is assumed that, after starting to travel at Time t=1, the transmitting device 11A is located in the communication area of the base station device 203, which can use the larger bandwidth, at Time t=10.

In the case where, at Time t=0, a packet loss occurs between the transmitting device 11A and the receiving device 13 occurs, it is improper that the transmitting device 11A determines the transmission rate on the basis of the packet loss rate and the jitter as in Embodiment 1. This is due to that the communication bandwidth available for the transmitting device 11A greatly varies from the communication area of the base station device 201 at Time t=0 to the communication area of the base station device 203 at Time t=10. As a result, the transmission rate determined based on the amount of change of the packet loss rate and the jitter at the two times: Time t=0 and Time t=10 is not necessarily appropriate. Therefore, the transmitting device cannot disadvantageously determine a proper transmission rate.

Thus, the transmitting device 11A in accordance with this embodiment determines the transmission rate on the basis of the amount of change of the travelling speed of the communication device. This will be described below in detail.

Figure 9:
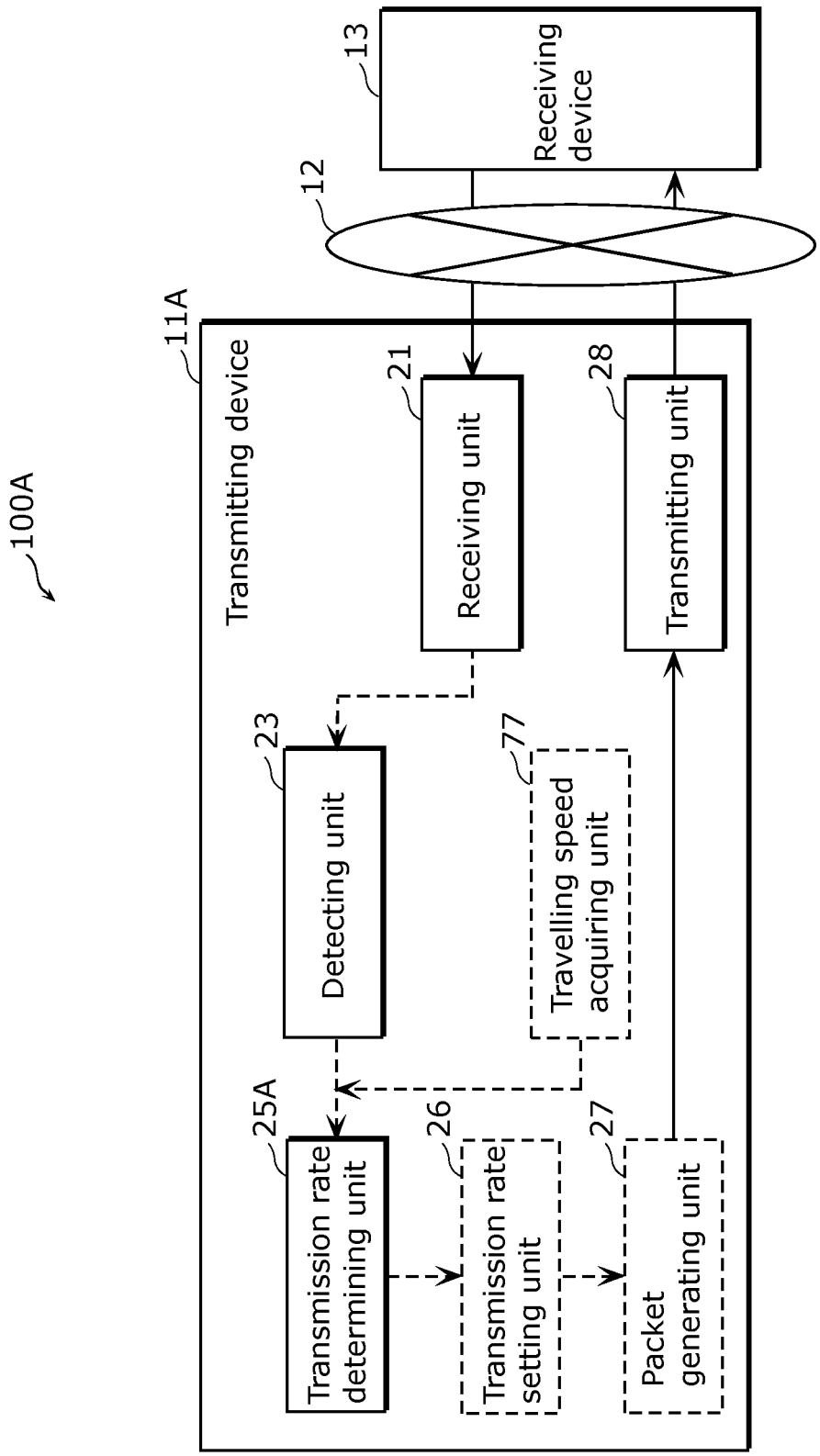
FIG. 9 is a view showing a configuration of a transmitting device in accordance with Embodiment 2.

FIG. 9 shows functional blocks of the transmitting device 11A in accordance with this embodiment. As shown in FIG. 9, the transmitting device 11A includes a receiving unit 21, a detecting unit 23, a travelling speed acquiring unit 77, a transmission rate determining unit 25A, a transmission rate setting unit 26, and a packet generating unit 27.

The transmitting device 11A in accordance with this embodiment is basically the same as the transmitting device 11 in accordance with Embodiment 1 except that the recovery width, which is the increase amount of the transmission rate, is determined based on the amount of change of the travelling speed of the communication device. Accordingly, the same constituents as those in the transmitting device 11 in accordance with Embodiment 1 are given the same reference numerals, and detailed description is omitted. That is, only differences between the transmitting device 11A in accordance with this embodiment and the transmitting device 11 in accordance with Embodiment 1 will be mainly described below.

The travelling speed acquiring unit 77 calculates positional information from GPS (Global Positioning System) information or received electric field intensity information. The travelling speed acquiring unit 77 calculates the travelling speed of the transmitting device 11A from temporal transition in the positional information.

When detecting a change of the reception interval of the feedback packet, the transmission rate determining unit 25A decreases the transmission rate at which the transmitting unit 28 transmits the communication packet. The transmission rate determining unit 25A increases the transmission rate on the basis of the amount of change of the travelling speed of at least either the transmitting device 11A or the receiving device 13, before and after the decrease in the transmission rate.

Figure 10:
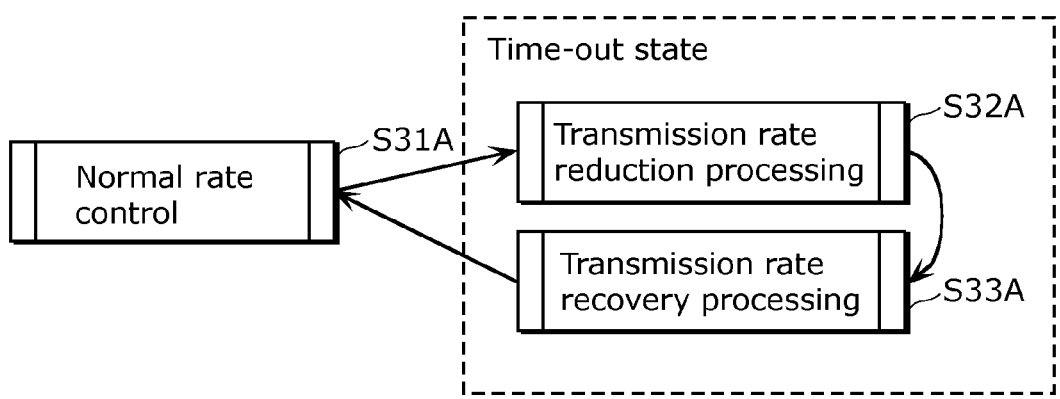
FIG. 10 is a state transition view of a transmission rate determining unit in accordance with Embodiment 2.

FIG. 10 is a state transition view showing transition of processing of the transmission rate determining unit 25A in accordance with this embodiment. In normal rate control (Step S31A), in place of the processing of transition to Step S32 (Step S43) in the processing in FIG. 5, which shows the normal rate control (Step S31) in Embodiment 1, processing of transition to Step S32A is executed. The same processing as each processing in FIG. 5 in Embodiment 1 other than the processing of transition to Step S32 is executed in Step S31A.

Figure 11:
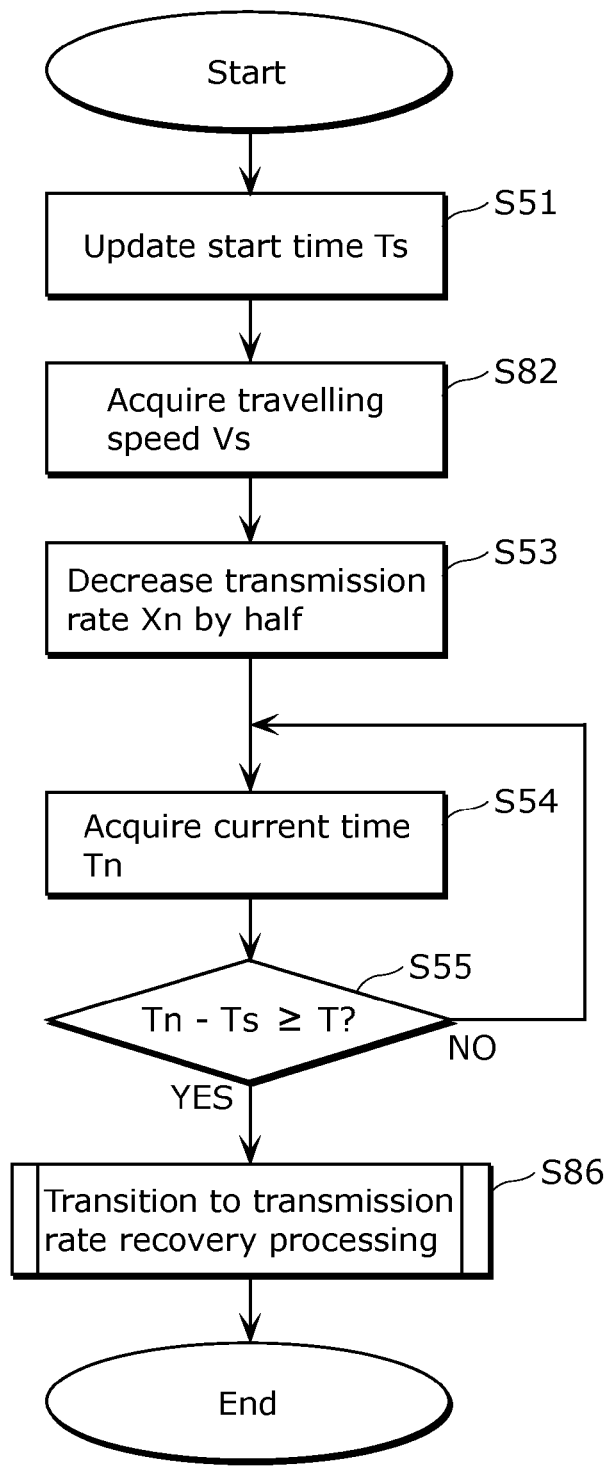
FIG. 11 is a flow chart showing flow of transmission rate reduction processing in accordance with Embodiment 2.

FIG. 11 is a detailed flow chart of transmission rate reduction processing (Step S32A in FIG. 10) of the transmission rate determining unit 25A in accordance with Embodiment 2. The same steps as those in the transmission rate reduction processing (Step S32, FIG. 6) in Embodiment 1 as shown in FIG. 6 are given the same reference numerals and detailed description thereof is omitted.

Before decreasing the transmission rate (Step S53 in FIG. 11), the transmission rate determining unit 25A acquires a travelling speed $V_s$ of the transmitting device 11A from the travelling speed acquiring unit 77 (Step S82).

After that, the transmission rate determining unit 25A waits for a certain time (Step S54, Step S55) and then, transitions to the transmission rate recovery processing (Step S33A in FIG. 10) (Step S86).

Figure 12:
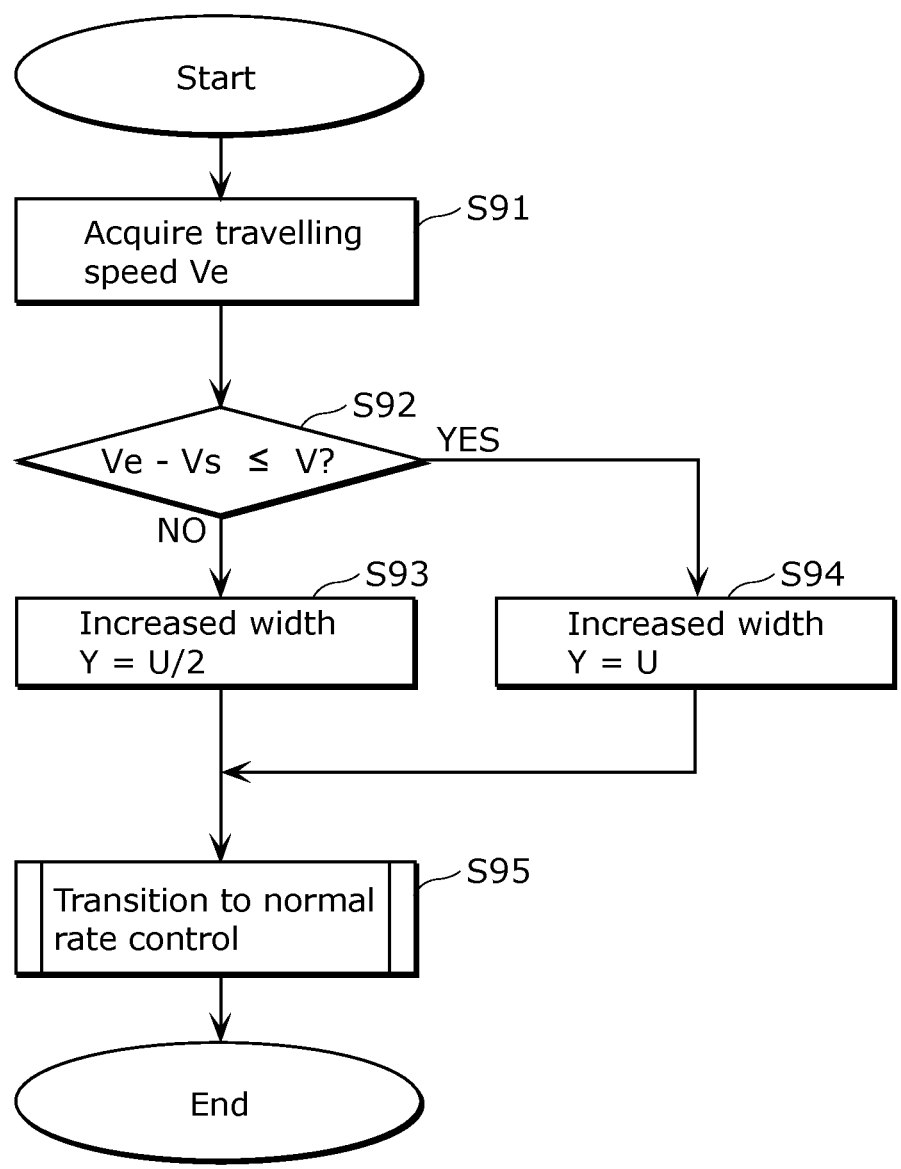
FIG. 12 is a flow chart showing flow of transmission rate recovery processing in accordance with Embodiment 2.

FIG. 12 is a detailed flow chart showing an algorism of the transmission rate recovery processing (Step S33A in FIG. 10) executed by the transmission rate determining unit 25A in accordance with Embodiment 2.

First, in Step S91, a current travelling speed $V_e$ of the communication device is acquired. Next, in Step S92, an amount of change $V_e-V_s$ from the travelling speed $V_s$ before reduction of the transmission rate is calculated. Given that the predetermined threshold is V, in the case where $V_e-V_s$ is smaller than or equal to V (YES in Step S92), the transmission rate determining unit 25 determines U as an increased width that is the increase amount of the transmission rate (Step S94). On the contrary, $V_e-V_s$ is larger than V (NO in Step S92), the increased width that is the increase amount of the transmission rate is determined to be U/2 (Step S93).

Then, the transmission rate determining unit 25 proceeds to the normal rate control (Step S31A in FIG. 10) (Step S95).

The travelling speed acquiring unit 77 may acquire the travelling speed of the receiving device 13 in place of the travelling speed of the transmitting device 11A. In this case, the transmission rate determining unit 25A determines the transmission rate on the basis of the travelling speed of the receiving device 13. For example, the receiving device 13 may include following information in the feedback packet or the other communication packets. The information is information indicating the travelling speed of the receiving device 13, which is acquired by the receiving device 13. The receiving device 13 transmits the feedback packet or the like including the information to the transmitting device 11A, so that the travelling speed acquiring unit 77 can acquire the travelling speed of the receiving device 13.

That is, the travelling speed acquiring unit 77 may use one or more of a change of base station information on the base station in the communication channel 12 to which the transmitting device 11A is connected, a change of intensity of an electric wave received by the transmitting device 11A via the communication channel 12, and information on the travelling speed of the receiving device 13, which is acquired from the receiving device 13, other than data acquired by the GPS. Thereby, the travelling speed acquiring unit 77 may acquire the travelling speed of at least either the transmitting device 11A or the receiving device 13.

The travelling speed acquiring unit 77 may acquire the travelling speed of the transmitting device 11A and the travelling speed of the receiving device 13. In this case, the transmission rate determining unit 25A determines the transmission rate on the basis of the travelling speed of the transmitting device 11A and the travelling speed of the receiving device 13. Specifically, the transmission rate determining unit 25A may use an average value, a difference value, or a total value of the travelling speed of the transmitting device 11A and the travelling speed of the receiving device 13, as $V_e$ and $V_s$ in Step S92 in FIG. 12.

The travelling speed acquiring unit 77 may acquire the travelling speed of the transmitting device 11A from an external device of the transmitting device 11A without calculating the travelling speed of the transmitting device 11A. For example, a speed measuring device installed in the environment may measure the travelling speed of the transmitting device 11A. The speed measuring device transmits can transmit a measurement result to the transmitting device 11A, so that the transmitting device 11A can acquire its travelling speed.

In the transmitting device 11A in accordance with Embodiment 2, the travelling speed acquiring unit 77 is provided separately from the transmission rate determining unit 25A. However, the transmission rate determining unit 25A may have the travelling speed acquiring unit 77 therein. In this case, processing to be executed by the travelling speed acquiring unit 77 is executed by the transmission rate determining unit 25A.

In the case where the transmitting device 11A transmits data that does not require encoding and packet generation, as the communication packet, like the transmitting device 11 in accordance with Embodiment 1, the transmitting device 11A does not need to include the transmission rate setting unit 26 and the packet generating unit 27 to achieve the same effects.

As described above, the transmission rate determining unit 25A determines the increase amount of the transmission rate to be larger as at least either the amount of change of the travelling speed of the transmitting device 11A or the receiving device 13 before and after the decrease in the transmission rate is smaller.

For example, in the case where the Ve is 100 km/h and $V_s$ is 0 km/h, there is a high probability that the transmitting device 11A travels to the communication area of a wireless bas station device that is different from a previous communication area. Therefore, by recovering the transmission rate more moderately as the probability that the transmitting device 11A travels to the communication area of the different wireless bas station device is higher, it is possible to determine the transmission rate that varies depending on the travelling speed.

By setting the $V_s$ to a speed at start of travelling (that is, 0) at all times, the transmission rate determining unit 25 may determine the transmission rate based on an absolute value of the travelling speed.

More specifically, in the case where the amount of change of the travelling speed is smaller than or equal to a predetermined threshold, the transmission rate determining unit 25A may determine the increase amount of the transmission rate to be a predetermined value. In the case where the amount of change of the travelling speed is larger than the predetermined threshold, the transmission rate determining unit 25A may determine the increase amount of the transmission rate to be a half of the predetermined value.

In this manner, even in the case where at least either of the transmitting device 11A or the receiving device 13 can travel between different wireless bas station devices, the proper transmission rate can be determined.

Figure 13:
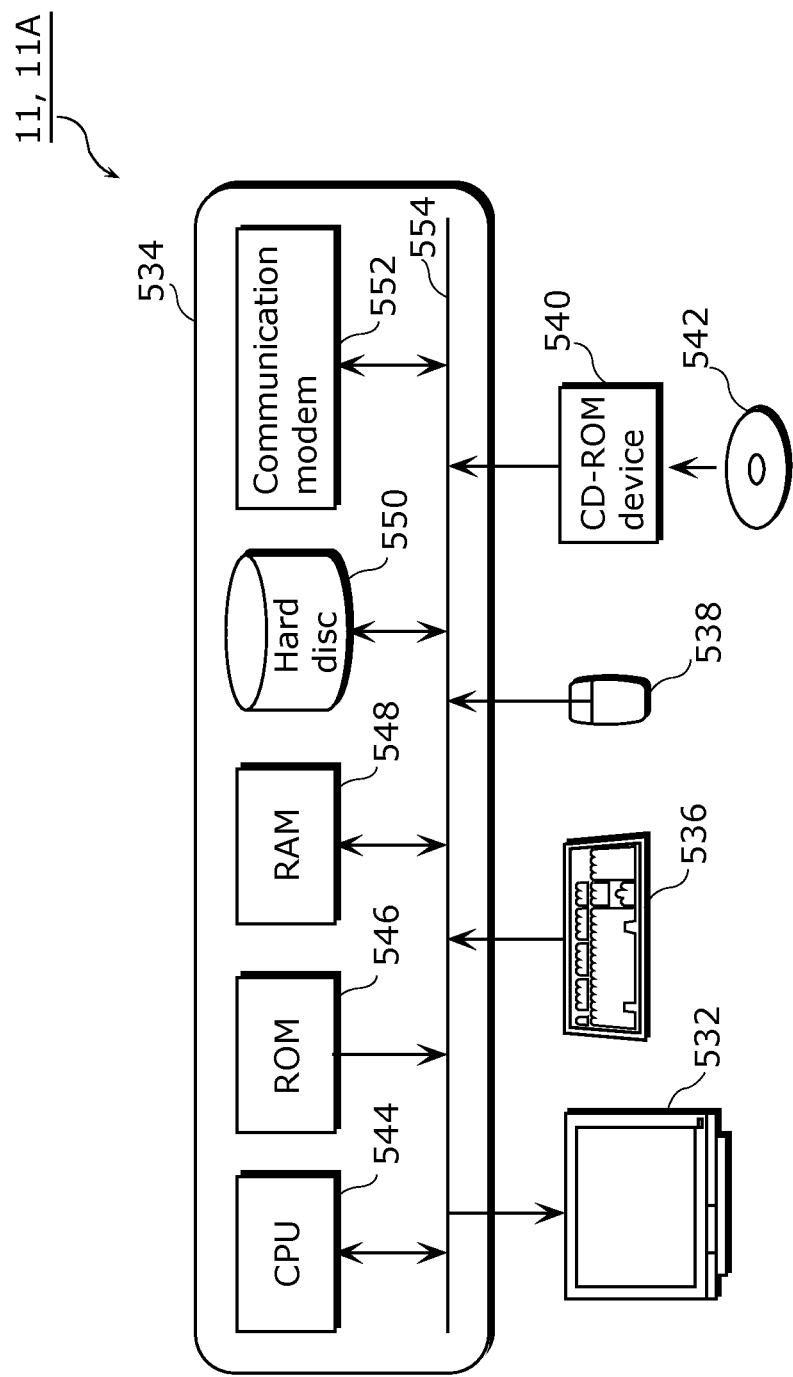
FIG. 13 is a block diagram showing a hardware configuration of a computer system that realizes the transmitting device in accordance with Embodiments 1 and 2 of the present invention.

The transmitting device 11 and the transmitting device 11A described in Embodiments 1 and 2 can be realized by the computer. FIG. 13 is a block diagram showing a hardware configuration of a computer system realizing the transmitting device 11 and the transmitting device 11A.

The transmitting device 11 and the transmitting device 11A each include a computer 534, a keyboard 536 and a mouse 538 that provide an instruction to the computer 534, a display 532 that presents information such as calculation results of the computer 534 and the like, and a CD-ROM (Compact Disc-Read Only Memory) device 540 and a communication modem (not shown) that read a program performed by the computer 534.

The program that describes processing executed by the transmitting device 11 and the transmitting device 11A is stored in a CD-ROM 542 as a computer-readable medium, and is read by the CD-ROM device 540. Alternatively, the program is read by a communication model 552 via a computer network.

The computer 534 includes a CPU (Central Processing Unit) 544, a ROM (Read Only Memory) 546, a RAM (Random Access Memory) 548, a hard disc 550, the communication model 552, and a bus 554.

The CPU 544 performs the program read by the CD-ROM device 540 or the communication model 552. The ROM 546 stores a program and data that are necessary for the operation of the computer 534. The RAM 548 stores data such as parameters at performance of the program. The hard disc 550 stores a program and data. The communication model 552 communicates with another computer via the computer network. The bus 554 interconnects the CPU 544, the ROM 546, the RAM 548, the hard disc 550, the communication model 552, the display 532, the keyboard 536, the mouse 538, and the CD-ROM device 540.

A part or whole of a constituent of each of the above-mentioned devices may be configured of one system LSI (Large Scale Integrated Circuit). The system LSI is a super-multifunctional LSI manufactured by integrating a plurality of configurations on one chip and specifically, is a computer system including a microprocessor, ROM, RAM and so on. The RAM stores a computer program. The microprocessor operates according to the computer program, thereby causing the system LSI to perform its function.

A part or whole of a constituent of each of the above-mentioned devices may be configured of IC card or a single module, which can be detachable from each of the devices. The IC card or the module is a computer system including a microprocessor, ROM, RAM and so on. The IC card or the module may include the above-mentioned super-multifunctional LSI. The microprocessor operates according to the computer program, thereby causing the IC card or the module to perform its function. The IC card or the module may have tamper proofness.

The present invention may be the above-mentioned method. Alternatively, the present invention may be a computer program for causing the computer to perform the method. Alternatively, the present invention may be a digital signal formed of the computer program.

The present invention may be a computer-readable recording medium that records the computer program or the digital signal, for example, a flexible disc, a hard disc, a CD-ROM, an MO, a DVD, a DVD-ROM, a DVD-RAM, a BD (Blue-ray Disc (registered mark)), a memory card such as a USB memory and an SD card, and a semiconductor memory. The present invention may be the digital signal recorded in the recording medium.

The present invention may be a device that transmits the computer program or the digital signal via a telecommunication line, a wireless or wired communication line, a network represented by the Internet, data broadcasting, or the like.

The present invention may be a computer system including a microprocessor and a memory, the memory may store a computer program, and the microprocessor operates according to the computer program.

By transferring the program or the digital signal recorded in the recording medium, or transferring the program or the digital signal via the network, the present invention may be implemented by another independent computer system.

The embodiments and the modifications may be combined with each other.

A first transmitting method according to this technique is a transmitting method for transmitting a communication packet to a receiving device via a communication channel, the method comprising: transmitting the communication packet to the receiving device; receiving a feedback packet, which is a response signal corresponding to the communication packet, from the receiving device; detecting a change of a reception interval of the feedback packet; and decreasing a transmission rate at which the communication packet is transmitting in the transmitting in the case where the change of the reception interval is detected, and increasing the transmission rate on the basis of an amount of change of a packet loss rate representing a loss rate of the communication packet and a jitter that is an amount of change of a transmission time of the communication packet, before and after the decrease in the transmission rate.

A second transmitting method according to this technique is a transmitting method for transmitting a communication packet to a receiving device via a communication channel, the method comprising: transmitting the communication packet to the receiving device; receiving a feedback packet, which is a response signal corresponding to the communication packet, from the receiving device; detecting a change of a reception interval of the feedback packet; and decreasing a transmission rate at which the communication packet is transmitting in the transmitting in the case where the change of the reception interval is detected, and increasing the transmission rate on the basis of an amount of change of a travelling speed of at least either the transmitting device or the receiving device, before and after the decrease in the transmission rate.

A program for causing the computer to perform one or both of the first and second transmitting methods may be used.

The embodiments disclosed herein are illustrative in all points, and are not limiting. The scope of the present invention is defined by CLAIMS, not the above description, and includes all changes within the meaning and scope equivalent to CLAIMS.

INDUSTRIAL APPLICABILITY

The present invention can be applied to a transmitting device, and in particular, to a transmitting device that transmits a communication packet to a receiving device via a communication channel.

REFERENCE SIGNS LIST 11, 11A transmitting device
12 communication channel
13 receiving device
14 communication packet
15 feedback packet
21 receiving unit
22 jitter acquiring unit
23 detecting unit
24 loss rate change acquiring unit
25, 25A transmission rate determining unit
26 transmission rate setting unit
27 packet generating unit
28 transmitting unit
77 travelling speed acquiring unit
100, 100A network system
201, 202, 203 base station device
532 display
534 computer
536 keyboard
538 mouse
540 CD-ROM device
542 CD-ROM
544 CPU
546 ROM
548 RAM
550 hard disc
552 communication modem
554 bus

The invention claimed is:

1. A transmitting device that transmits a communication packet to a receiving device via a communication channel, the transmitting device comprising:
   a transmitting unit configured to transmit the communication packet to the receiving device;
   a receiving unit configured to receive, from the receiving device, a feedback packet that is a response signal corresponding to the communication packet;
   a detecting unit configured to detect a change of a reception interval of the feedback packet; and
   a transmission rate determining unit configured to decrease a transmission rate at which the transmitting unit transmits the communication packet in the case where the change of the reception interval is detected, and to increase the transmission rate on the basis of an amount of change of a packet loss rate representing a loss rate of the communication packet and a jitter that is an amount of change of a transmission time of the communication packet, before and after the decrease in the transmission rate.

2. The transmitting device according to claim 1,
   wherein the transmission rate determining unit is configured to determine an amount of increase in the transmission rate and increase the transmission rate by the determined increases amount, the increase amount being smaller as the amount of change of the packet loss rate and the jitter are larger.

3. The transmitting device according to claim 2, wherein the transmission rate determining unit is configured to acquire the amount of change of the packet loss rate from information indicating the packet loss rate of the communication packet, the information being included in the feedback packet.

4. The transmitting device according to claim 2, wherein the transmission rate determining unit is configured to acquire the jitter by measuring one-way delay of the communication channel before and after the transmission rate is decreased.

5. The transmitting device according to claim 2, wherein the transmission rate determining unit is configured to:
determine the increase amount of the transmission rate to be a predetermined value in the case where the amount of change of the packet loss rate and the jitter are smaller than respective predetermined thresholds;
determine the increase amount of the transmission rate to be a half of the predetermined value in the case where either the amount of change of the packet loss rate or the jitter is larger than or equal to a corresponding one of the predetermined thresholds; and
determine the increase amount of the transmission rate to be a quarter of the predetermined value in the case where the amount of change of the packet loss rate and the jitter are larger than or equal to the respective predetermined thresholds.

6. The transmitting device according to claim 2, wherein the transmission rate determining unit is configured to:
determine the increase amount of the transmission rate to be a predetermined value in the case where the amount of change of the packet loss rate is smaller than a first threshold and the jitter is smaller than a second threshold,
determine the increase amount of the transmission rate to be a half of the predetermined value in the case where the amount of change of the packet loss rate is smaller than the first threshold and the jitter is larger than or equal to the second threshold and is smaller than a third threshold; and
determine the increase amount of the transmission rate to be a quarter of the predetermined value in the case where the amount of change of the packet loss rate is smaller than the first threshold and the jitter is larger than or equal to the third threshold.

7. The transmitting device according to claim 2, wherein the transmission rate determining unit is configured to estimate a buffer amount of the communication channel, and determine the increase amount of the transmission rate to be smaller as the jitter and the amount of change of the packet loss rate are larger, and as a value obtained by dividing the buffer amount by the transmission rate is smaller.

8. The transmitting device according to claim 7, wherein the transmission rate determining unit
determines the increase amount of the transmission rate to be a first increase amount determined based on a state of the communication channel, in the case where the jitter is smaller than the value obtained by dividing the buffer amount by the transmission rate,
determines the increase amount of the transmission rate to be a half of the first increase amount in the case where the jitter is larger than or equal to the value obtained by dividing the buffer amount by the transmission rate, and is smaller than twice the value obtained by dividing the buffer amount by the transmission rate, and
determines the increase amount of the transmission rate to be a quarter of the first increase amount in the case where the jitter is larger than or equal to twice the value obtained by dividing the buffer amount by the transmission rate.

9. A transmitting device that transmits a communication packet to a receiving device via a communication channel, the transmitting device comprising:
a transmitting unit configured to transmit the communication packet to the receiving device;
a receiving unit configured to receive, from the receiving device, a feedback packet that is a response signal corresponding to the communication packet;
a detecting unit configured to detect a change of a reception interval of the feedback packet; and
a transmission rate determining unit configured to decrease a transmission rate at which the transmitting unit transmits the communication packet in the case where the change of the reception interval is detected, and to increase the transmission rate on the basis of an amount of change of a travelling speed of at least either the transmitting device or the receiving device before and after the decrease in the transmission rate.

10. The transmitting device according to claim 9, wherein the transmission rate determining unit is configured to determine an amount of increase in the transmission rate and increase the transmission rate by the determined increase amount, the increase amount being larger as the amount of change of the travelling speed of at least either the transmitting device or the receiving device before and after the decrease in the transmission rate, is smaller.

11. The transmitting device according to claim 10, wherein the transmission rate determining unit determines the increase amount of the transmission rate to be a predetermined value in the case where the amount of change of the travelling speed is smaller than or equal to a predetermined threshold, and
determines the increase amount of the transmission rate to be a half of the predetermined value in the case where the amount of change of the travelling speed is larger than the predetermined threshold.

12. The transmitting device according to claim 9, wherein the transmission rate determining unit acquires the travelling speed of at least either the transmitting device or the receiving device by using one of more of data acquired from a GPS (Global Positioning System), a change of information on a base station in the communication channel to which the transmitting device is connected, a change of intensity of an electrical wave received by the transmitting device via the communication channel, and information on the travelling speed of the receiving device, which is acquired from the receiving device.

13. A transmitting method for transmitting a communication packet to a receiving device via a communication channel, the method comprising:
transmitting the communication packet to the receiving device;
receiving a feedback packet, which is a response signal corresponding to the communication packet, from the receiving device;

detecting a change of a reception interval of the feedback packet; and decreasing a transmission rate at which the communication packet is transmitted in the transmitting in the case where the change of the reception interval is detected, and increasing the transmission rate on the basis of an amount of change of a packet loss rate representing a loss rate of the communication packet and a jitter that is an amount of change of a transmission time of the communication packet, before and after the decrease in the transmission rate.

14. A non-transitory computer-readable recording medium having recorded thereon a program for causing a computer to execute the transmitting method according to claim 13.

15. An integrated circuit that transmits a communication packet to a receiving device via a communication channel, the integrated circuit comprising:

a transmitting unit configured to transmit the communication packet to the receiving device;

a receiving unit configured to receive, from the receiving device, a feedback packet that is a response signal corresponding to the communication packet;

a detecting unit configured to detect a change of a reception interval of the feedback packet; and a transmission rate determining unit configured to decrease a transmission rate at which the transmitting unit transmits the communication packet in the case where the change of the reception interval is detected, and to increase the transmission rate on the basis of an amount of change of a packet loss rate representing a loss rate of the communication packet and a jitter that is an amount of change of a transmission time of the communication packet, before and after the decrease in the transmission rate.

16. A transmitting method for transmitting a communication packet to a receiving device via a communication channel, the method comprising:

transmitting the communication packet to the receiving device;

receiving a feedback packet that is a response signal corresponding to the communication packet, from the receiving device;

detecting a change of a reception interval of the feedback packet; and decreasing a transmission rate at which the communication packet is transmitted in the transmitting in the case where the change of the reception interval is detected, and increasing the transmission rate on the basis of an amount of change of a travelling speed of at least either the transmitting device or the receiving device, before and after the decrease in the transmission rate.

17. A non-transitory computer-readable recording medium having recorded thereon a program for causing a computer to execute the transmitting method according to claim 16.

18. An integrated circuit that transmits a communication packet to a receiving device via a communication channel, the integrated circuit comprising:

a transmitting unit configured to transmit the communication packet to the receiving device;

a receiving unit configured to receive, from the receiving device, a feedback packet, which is a response signal corresponding to the communication packet;

a detecting unit configured to detect a change of a reception interval of the feedback packet; and a transmission rate determining unit configured to decrease a transmission rate at which the transmitting unit transmits the communication packet in the case where the change of the reception interval is detected, and to increase the transmission rate on the basis of an amount of change of a travelling speed of at least either the transmitting device or the receiving device before and after the decrease in the transmission rate.

* * * * *